US008679335B1

(12) United States Patent
Dufort

(10) Patent No.: US 8,679,335 B1
(45) Date of Patent: Mar. 25, 2014

(54) VEHICLE-MOUNTED VACUUM SYSTEM AND METHOD OF SEPARATING LIQUID AND SOLIDS FRACTIONS OF A SLUDGE-LIKE MIXTURE INSIDE A CONTAINER

(71) Applicant: Saniprotex Inc., Varennes (CA)

(72) Inventor: Denis Dufort, Sainte-Julie (CA)

(73) Assignee: Saniprotex Inc., Varennes, Quebec (CA)

( * ) Notice: Subject to any disclaimer, the term of this patent is extended or adjusted under 35 U.S.C. 154(b) by 0 days.

(21) Appl. No.: 13/724,900

(22) Filed: Dec. 21, 2012

(51) Int. Cl.
*B01D 29/68* (2006.01)

(52) U.S. Cl.
USPC ........ 210/241; 210/406; 210/409; 210/416.1; 210/791; 15/320; 134/104.4

(58) Field of Classification Search
None
See application file for complete search history.

(56) References Cited

U.S. PATENT DOCUMENTS

| | | | | |
|---|---|---|---|---|
| 1,343,471 A * | 6/1920 | Otterson | .................... | 210/241 |
| 2,596,151 A * | 5/1952 | Hudson | ................... | 134/168 R |
| 3,013,665 A * | 12/1961 | Schmidt et al. | ............... | 210/241 |
| 3,262,571 A | 7/1966 | Petretti | | |
| 3,317,049 A * | 5/1967 | Petretti | ..................... | 210/241 |
| 4,213,479 A * | 7/1980 | Pearson | ...................... | 137/493 |
| 4,360,436 A * | 11/1982 | Poveromo | .................... | 210/799 |
| 4,389,314 A * | 6/1983 | Petretti | ..................... | 210/241 |
| 4,436,622 A * | 3/1984 | Petretti | ..................... | 210/232 |
| 4,525,277 A | 6/1985 | Poulin | | |
| 4,543,183 A * | 9/1985 | Petretti | ..................... | 210/187 |
| 4,578,198 A * | 3/1986 | Schmidt et al. | .............. | 210/780 |
| 4,646,769 A * | 3/1987 | O'Brien et al. | .............. | 134/199 |
| 4,702,847 A * | 10/1987 | Fux et al. | ...................... | 210/798 |
| 4,898,671 A * | 2/1990 | Fux et al. | ................. | 210/333.01 |
| 5,098,580 A * | 3/1992 | Andersen | ....................... | 210/745 |
| 5,124,029 A * | 6/1992 | Fjallstrom et al. | ............ | 209/250 |
| 5,268,095 A * | 12/1993 | Barzuza | ........................ | 210/143 |
| 5,312,551 A * | 5/1994 | Perron et al. | .................. | 210/712 |
| 5,492,635 A | 2/1996 | Ball | | |
| 5,503,753 A * | 4/1996 | Woodall et al. | ............... | 210/803 |
| 5,536,418 A | 7/1996 | Foss | | |
| 5,720,885 A * | 2/1998 | Moos | ............................ | 210/710 |
| 6,267,879 B1 * | 7/2001 | Gil | ................................ | 210/107 |
| 6,284,136 B1 * | 9/2001 | Tuori et al. | ..................... | 210/331 |
| 6,379,547 B1 | 4/2002 | Larsson | | |
| 6,790,368 B1 | 9/2004 | Vachon et al. | | |
| 7,429,319 B2 * | 9/2008 | Davis | ........................... | 210/121 |

(Continued)

FOREIGN PATENT DOCUMENTS

| | | |
|---|---|---|
| CN | 101333059 A | 12/2008 |
| DE | 3709671 A1 | 10/1988 |
| DE | 4020062 A1 | 1/1992 |
| DE | 10331463 A1 | 3/2005 |

(Continued)

*Primary Examiner* — Robert James Popovics
(74) *Attorney, Agent, or Firm* — IPAXIO S.E.N.C.

(57) ABSTRACT

The vacuum system (100) is mounted on a vehicle (102). It includes a dewatered solid matter compartment (142), a liquid matter compartment (144), a main flexible hose (130), and an immersible suction head (120) connected to a distal end of the main flexible hose (130). The suction head (120) includes a static dewatering screen filter (150) and a screen-washing arrangement (170) cooperating with the suction head (120). The screen-washing arrangement (170) is in fluid communication with the liquid matter compartment (144) through a high-pressure liquid circuit. The screen-washing arrangement (170) using the liquid matter from the liquid matter compartment (142) as a washing fluid. A method of separating solids and liquid fractions is also disclosed.

14 Claims, 4 Drawing Sheets

(56) References Cited

U.S. PATENT DOCUMENTS

| | | |
|---|---|---|
| 7,846,331 B2 | 12/2010 | Baziuk |
| 8,297,447 B2 * | 10/2012 | Sorenson et al. ............. 210/411 |
| 8,377,291 B2 * | 2/2013 | Eckman ........................ 210/86 |
| 8,444,862 B2 * | 5/2013 | Ralvert ......................... 210/780 |
| 8,524,075 B1 * | 9/2013 | Quintel ........................ 210/108 |
| 2011/0047743 A1 | 3/2011 | Shepherd |

FOREIGN PATENT DOCUMENTS

| | | |
|---|---|---|
| EP | 0437465 A1 | 7/1991 |
| EP | 0668247 A1 | 8/1995 |
| EP | 1800767 A2 | 6/2007 |
| FR | 2770578 A1 | 5/1999 |
| KR | 20080092511 A | 10/2008 |
| KR | 100996969 B1 | 11/2010 |

* cited by examiner

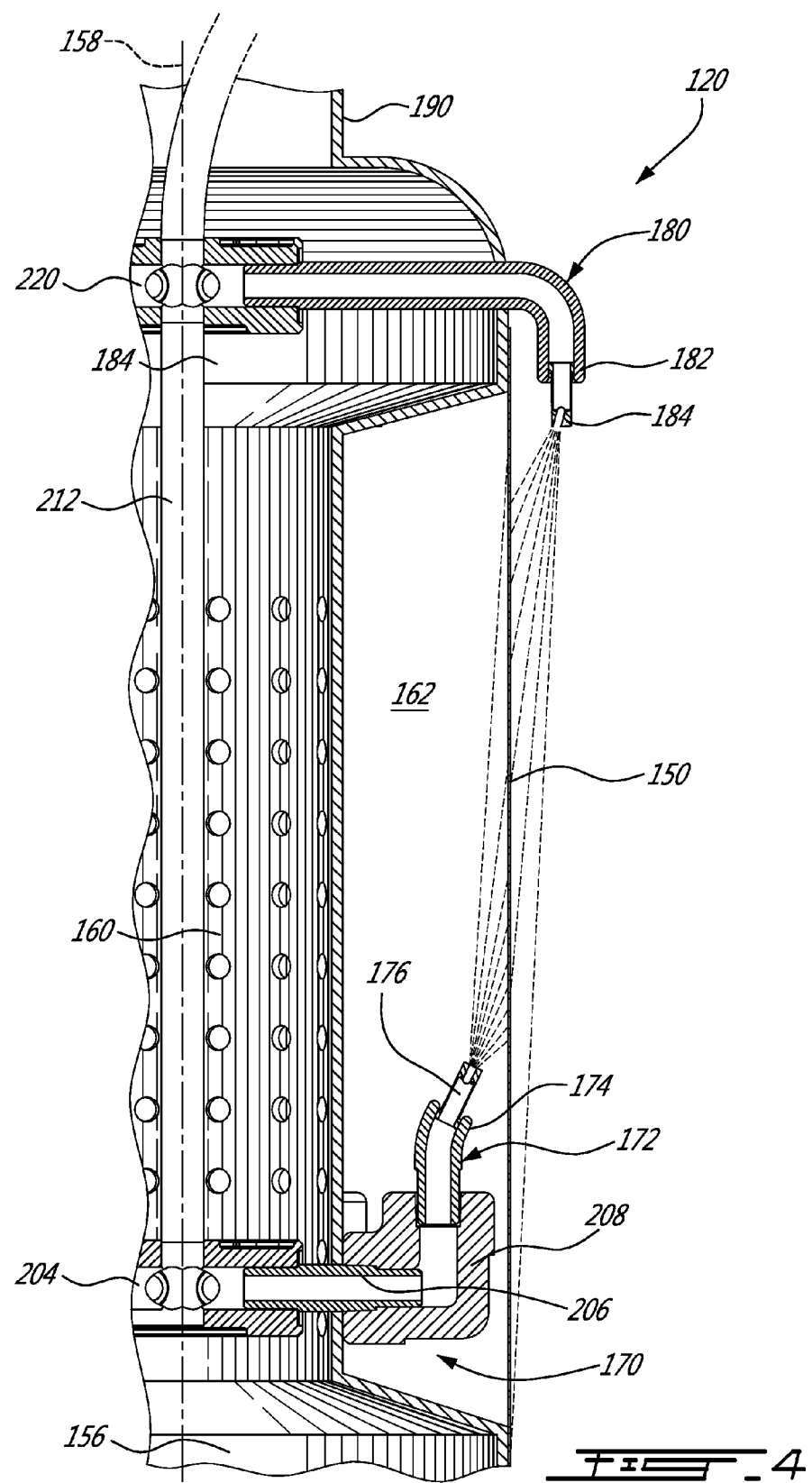

VEHICLE-MOUNTED VACUUM SYSTEM AND METHOD OF SEPARATING LIQUID AND SOLIDS FRACTIONS OF A SLUDGE-LIKE MIXTURE INSIDE A CONTAINER

TECHNICAL FIELD

The technical field relates generally to vehicle-mounted vacuum systems. It also relates generally to methods of separating liquid and solids fractions of sludge-like mixtures located inside containers using vehicle-mounted vacuum systems.

BACKGROUND

There are many situations where containers having sludge-like mixtures must be cleaned by removing the solids fraction therefrom. Examples of such containers are septic tanks Septic tanks are generally cleaned using vacuum systems mounted on vehicles such as trucks. These vehicles can transport the vacuum systems were they are needed and then transport the removed waste content to appropriate waste disposal facilities or storage locations.

When cleaning a septic tank, it is generally desirable to return the liquid fraction back into the septic tank before the vehicle leaves the site. The liquid fraction contains microorganisms promoting the decay of organic matters coming with the waste water into the septic tank. This way, the microflora then remains present inside the septic tank. Returning the liquid fraction also increases the number of sites a same vehicle can clean in a single run before emptying the accumulated waste content.

An example of a vehicle-mounted vacuum system is shown in U.S. Pat. No. 6,790,368 issued 14 Sep. 2004 to Vachon et al. Many other kinds of vacuum systems exist.

Typically, a conventional vacuum system first removes the entire content of a septic tank to be cleaned and transfers this content into one or more tanks on the vehicle. The solids and liquid fractions are separated onto the vehicle and the liquid matter is then returned back into the septic tank. This procedure, however, requires a relatively complex and costly dewatering arrangement on each vehicle. The internal components of the dewatering arrangement will not be available to the operator during the cleaning procedure and also until the tank or tanks on the vehicle are emptied, for instance at the waste disposal facility. Moreover, the intense intermixing of the content resulting from the integral vacuum pumping of the sludge-like mixture also makes the solids and liquid fractions even more difficult to separate. This dewatering procedure is thus not optimum. It also leaves a relatively a high proportion of liquids within the remaining waste content to be transported by the vehicle when it leaves the site.

Accordingly, there is still room for many improvements in this area of technology.

SUMMARY

The proposed concept provides a new approach in separating liquid and solids fractions of a sludge-like mixture inside a container using a vehicle-mounted vacuum system. Briefly stated, the concept involves dewatering the sludge-like mixture within the container by separating the liquid fraction from the solids fraction using a suction head immersed directly into the sludge-like mixture inside the container. The liquid fraction and the solids fraction are also never mixed together on the vehicle.

In one aspect, there is provided a vacuum system mounted on a vehicle for dewatering a sludge-like mixture within a container, removing dewatered solid matter from within the container and then returning liquid matter removed from the sludge-like mixture back inside the container, the system including: a vacuum tank dewatered solid matter compartment, the solid matter compartment having an upper portion and a bottom portion; a vacuum tank liquid matter compartment, the liquid matter compartment having an upper portion and a bottom portion, the upper portion of the liquid matter compartment being in direct fluid communication with the upper portion of the solid matter compartment to equalize pressure; a main flexible hose having a proximal end and a distal end, the proximal end being selectively made in fluid communication with the solid matter compartment or the liquid matter compartment; and an immersible suction head connected to the distal end of the main flexible hose, the suction head including a static dewatering screen filter and a screen-washing arrangement cooperating with the screen filter, the screen-washing arrangement being in fluid communication with the liquid matter compartment through a high-pressure liquid circuit and using the liquid matter from the liquid matter compartment as a washing fluid.

In another aspect, there is provided a method of separating a liquid fraction and a solids fraction of a sludge-like mixture located inside a container using a vacuum system mounted on a vehicle, the method including: dewatering the sludge-like mixture within the container by separating the liquid fraction from the solids fraction using a suction head immersed directly into the sludge-like mixture inside the container, the liquid fraction being aspirated through a screen filter mounted on the suction head and being then temporarily stored onto the vehicle while the solids fraction remains inside the container; washing the screen filter at least once using a portion of the liquid fraction temporarily stored on the vehicle; aspirating the substantially dewatered solids fraction from within the container onto the vehicle, the liquid fraction and the solids fraction being always maintained separate from one another while both are present onto the vehicle; returning only the liquid fraction back into the container; and then transporting the solids fraction and the suction head away from the container using the vehicle.

Details on these aspects as well as other aspects of the proposed concept will be apparent from the following detailed description and the appended figures.

BRIEF DESCRIPTION OF THE FIGURES

FIG. 4 is a longitudinal cross-sectional view taken along line 4-4 in FIG. 2.

DETAILED DESCRIPTION

Figure 1:
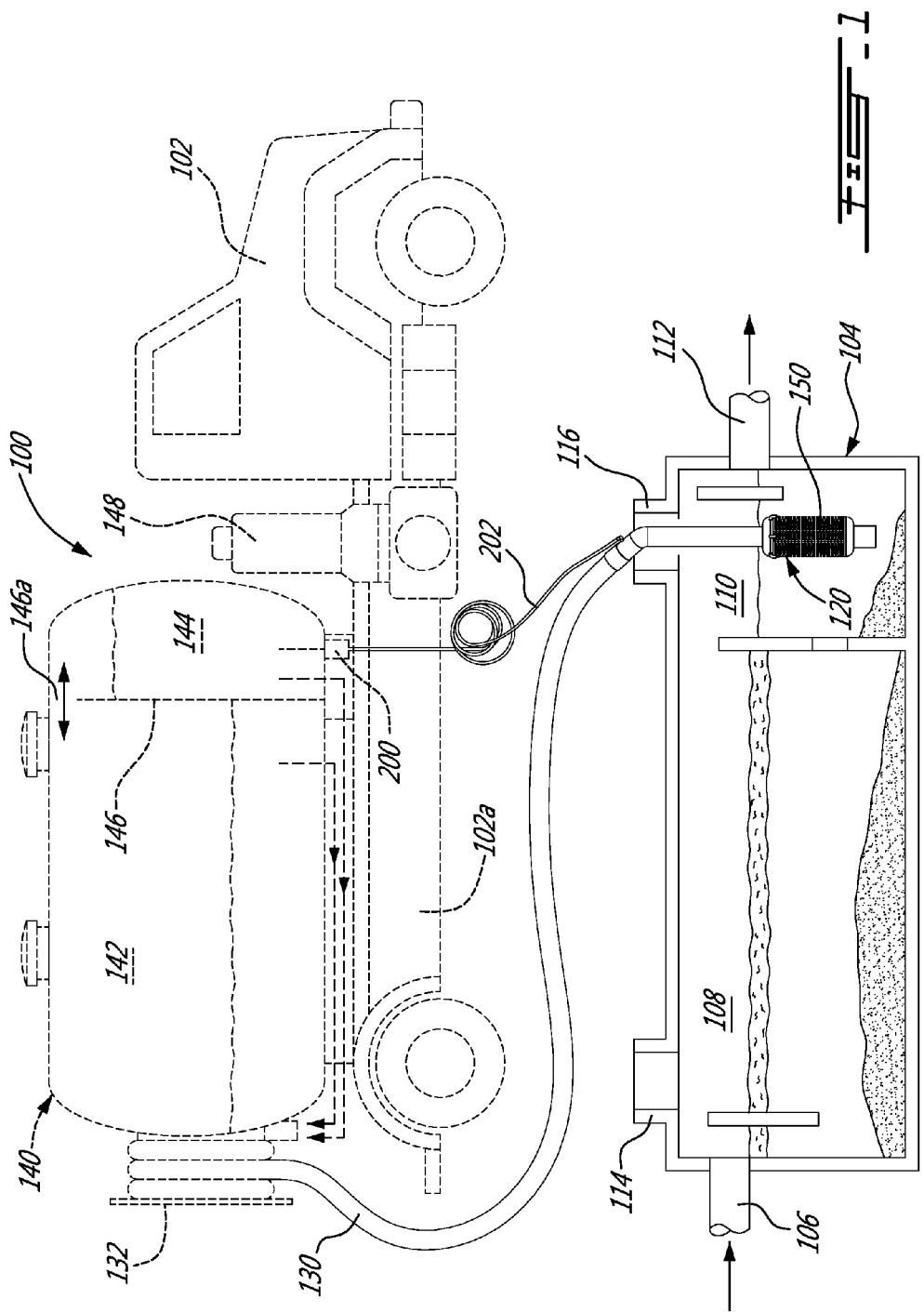
FIG. 1 is a semi-schematic view illustrating an example of a vacuum system as proposed herein, which system is mounted on an example of a generic vehicle and shown cleaning an example of a generic container.

FIG. 1 is a semi-schematic view illustrating an example of a vacuum system 100 as proposed herein. This system 100 is mounted on an example of a generic vehicle 102 and is shown as it would be when cleaning an example of a generic container 104. Although the illustrated vehicle 102 is a truck, using other kinds of vehicles is also possible, depending on the implementations. Likewise, although the illustrated container 104 is a septic tank, having other kinds of containers is also possible, again depending on the implementations.

The vehicle 102 includes a chassis 102a on which the vacuum system 100 is transported from site to site. The exact configuration and disposition of the components can vary from one implementation to another.

It should be noted that the word "clean", as well as other similar words and expressions, are always used in a generic manner. They broadly refer to the goal of removing most of the solids fraction from inside the septic tank 104. The required degree of cleanness can vary from implementation to another and may depend on how the operator is meticulous in the tasks to achieve.

The illustrated septic tank 104 is designed to receive waste water at an inlet 106 from a waste water source, for example the sewage system of a house. Many other situations exist. The interior of the septic tank 104 is generally subdivided in two or more chambers 108, 110, as shown. Variants are possible as well. The exact construction of the septic tank 104 does not form part of the proposed concept and need not to be discussed in further details.

Waste water coming from the waste water source includes solid matter and liquid matter. Surplus of the liquid matter exits the septic tank 104 through an outlet 112 after most solids in suspension where decanted therefrom. Thus, over time, the solid matter accumulates within the septic tank 104, especially at the bottom thereof, and must be removed from the septic tank 104 from time to time. While inside the septic tank 104, the solids fraction and the liquid fraction form a sludge-like mixture. Some solid matter and scum may also float on the surface of the liquid matter and/or be in suspension therein. The sludge-like mixture can thus have more than one layer and the liquid/solids proportions may vary from one layer to another. The sludge-like mixture is thus not necessary homogenous and the expression "sludge-like mixture" is used herein in a generic manner. This also applies to other situations where the container is not a septic tank. The solid matter inside the septic tank 104 may contain debris and/or non-organic matter, such as sand, rocks, etc.

The interior of the illustrated septic tank 104 can be accessed using one or more manholes 114, 116 that are normally closed by corresponding covers (not shown). The illustrated septic tank 104 is also located underground. Variants are possible as well.

After positioning the vehicle 102 next to the septic tank 104 and opening the manholes 114, 116, the first actual step of the cleaning is the dewatering of the sludge-like mixture. However, unlike other vacuum systems, the dewatering made by the system 100 is entirely carried out within the septic tank 104 and not on the vehicle 102. This dewatering involves separating the liquid fraction from the solids fraction using a suction head 120 immersed directly into the sludge-like mixture inside the septic tank 104. The suction head 120 is attached to the distal end of a main flexible hose 130 carried on the vehicle 102, for instance mounted on a reel 132, as shown. Variants are possible as well. In use, the main flexible hose 130 can be extended to cover at least the distance between the vehicle 102 and the interior of the septic tank 104.

The illustrated system 100 includes a single vacuum tank 140 in which is provided a dewatered solid matter compartment 142 and a liquid matter compartment 144. The contents of both compartments 142, 144 are always separated from one another using, for instance, an intervening partition wall 146. Variants of this configuration are also possible. For instance, the liquid matter compartment 144 can be provided on a separate vacuum tank (not shown) located elsewhere on the chassis 102a of the vehicle 102. Other alternative configurations are also possible. The partition wall 146 is designed to withstand the inertia forces applied thereon when the vehicle 102 is travelling.

The vacuum system 100 includes a vacuum pump arrangement 148 that is in fluid communication with the solid matter compartment 142 and the liquid matter compartment 144. The vacuum pump arrangement 148 creates a negative pressure inside the vacuum tank 140 that is sufficient to pump the content of the septic tank 104 onto the vehicle 102, for instance −15 psi (about −103 kPa). Other values are possible. The vacuum pump arrangement 148 can be powered using the engine of the vehicle 102, for instance directly through a mechanical connection or indirectly using a hydraulic circuit or the like. Variants are also possible.

One aspect of the proposed concept is to create a direct fluid communication between the upper portion of the solid matter compartment 142 and the upper portion of the liquid matter compartment 144 to equalize pressure under vacuum conditions. This considerably reduces the mechanical stress on the partition wall 146 when one is provided. In the illustrated example, the upper portion of the partition wall 146 includes a top opening 146a. Air and other gases are thus free to pass between the compartments 142, 144 to equilibrate the pressure, as schematically shown. Alternatively, one or more conduits can be provided inside and/or outside the vacuum tank 140 to achieve the goal of having a direct fluid communication. Other variants are possible as well.

Also in the illustrated example, the solid matter compartment 142 is made significantly larger in volume than the liquid matter compartment 144. This will maximize the number of sites that the vehicle 102 can clean before the solid matter compartment 142 is full. When full, or when otherwise needed, the content of the solid matter compartment 142 is emptied at a waste disposal facility. Alternatively, the content can be transferred into a storage tank, for instance a larger tank on another vehicle, before the content is sent to the waste disposal facility. The illustrated solid matter compartment 142 is located at the rear of the vacuum tank 140 so as to facilitate the removal of the solids matter therefrom. Variants are also possible.

In use, to clean the illustrated septic tank 104, the suction head 120 is introduced by the operator through each manhole 114, 116 by holding the main flexible hose 130, generally by hand. Initially, the liquid fraction is aspirated without the solids fraction using a static dewatering screen filter 150 mounted on the suction head 120. This screen filter 150 is said to be static since it is not rotating using a rotation mechanism or the like. The screen filter 150 includes a multitude of small holes or perforations to promote the separation. Before the liquid matter enters the suction head 120 These holes or perforations are generally between about 1 mm and 7 mm. Other values are also possible.

The illustrated screen filter 150 is substantially cylindrical. It includes an outer screen surface and an inner screen surface. The screen surface area, the diameter of the holes or perforations and the spacing between them are designed so as to significantly increase the total inlet area compared to that of the main flexible hose 130. The ratio can be instance 7:1 to 8:1, other values being also possible. This way, the flow velocity is considerably reduced at the outer screen surface of the screen filter 150. The liquid molecules will then be separated more easily from the generally heavier solid molecules.

From the suction head 120, the liquid fraction is aspirated into the main flexible hose 130 and then goes into the liquid matter compartment 144 on the vehicle 102, where it will be temporarily stored while the solids fraction of the septic tank 104 is still therein. While onto the vehicle 102, the solids fraction and the liquid fraction never mix together. The operator will move the suction head 120 from time or time within the septic tank 104 to reach the entire content thereof. This generally takes a few minutes to be completed. The dewatering ends when the operator sees that no more liquid matter or no significant amount of liquid matter can be removed from what is left of the initial sludge-like mixture. This considerably denser substance is what is referred to as the dewatered solid matter in the context of the present concept.

Figure 2:
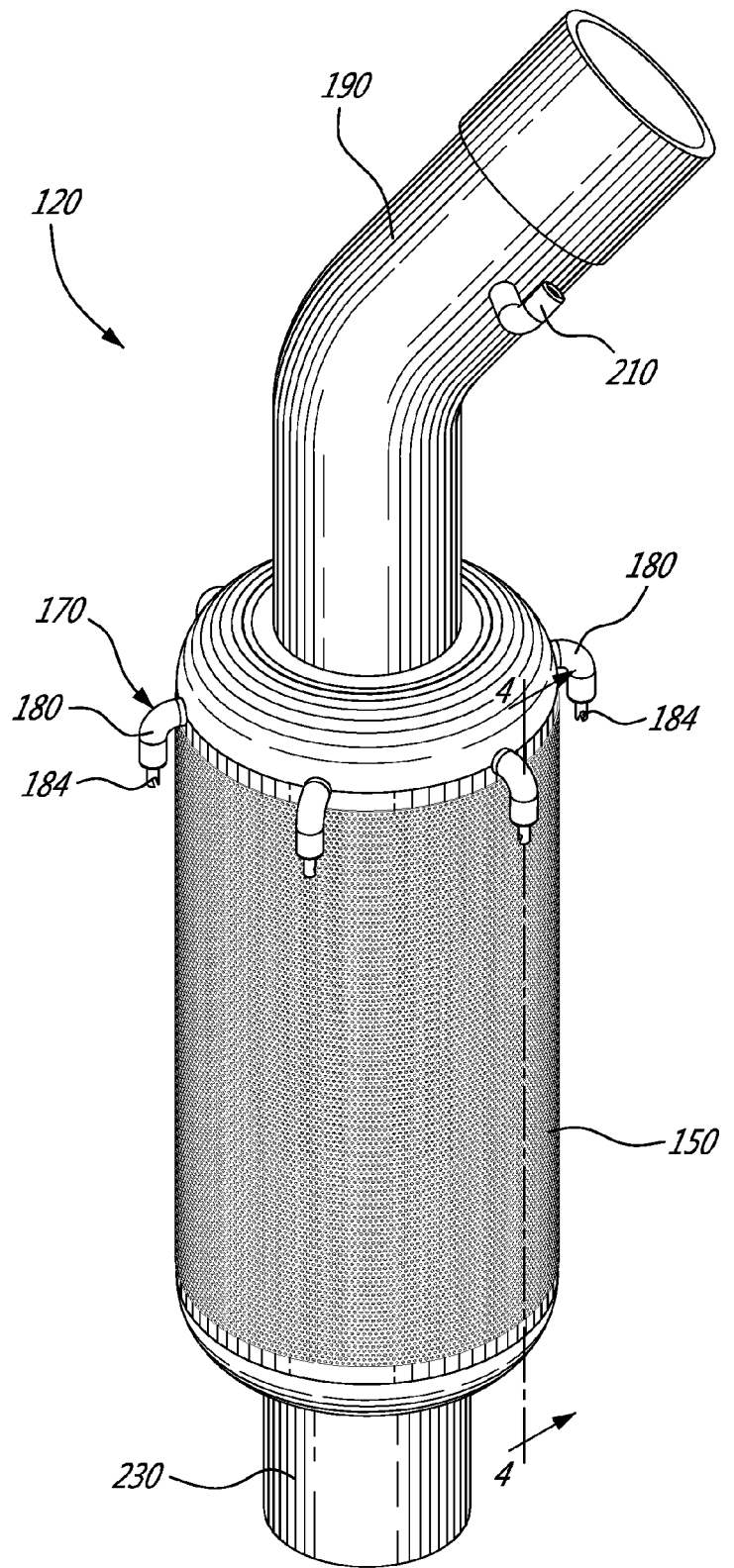
FIG. 2 is an isometric view illustrating the suction head of the vacuum system of FIG. 1.
Figure 3:
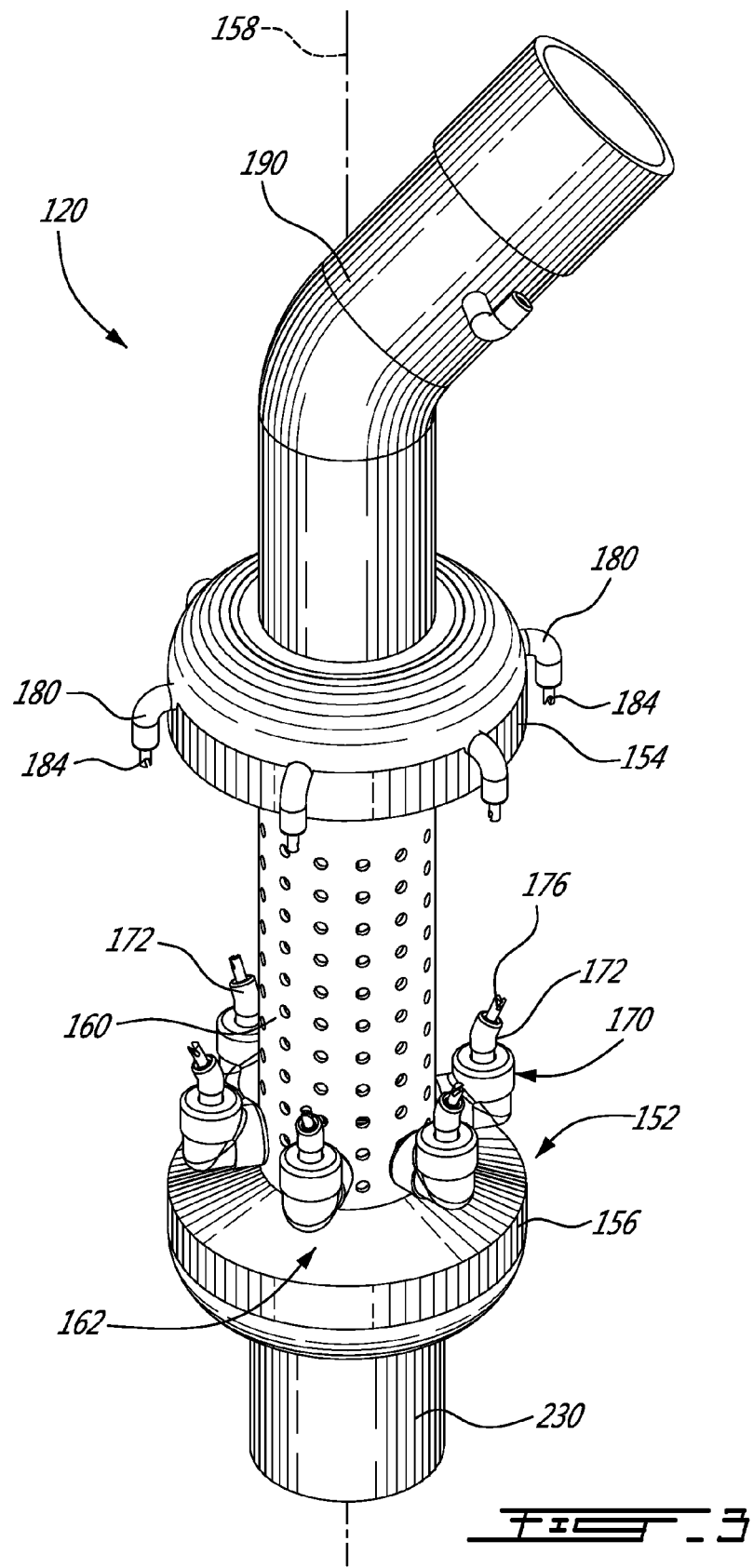
FIG. 3 is a view similar to FIG. 2 but showing the suction head without the screen filter.

FIG. 2 is an isometric view illustrating the suction head 120 of the vacuum system 100. FIG. 3 is a view similar to FIG. 2 but showing the suction head 120 without the screen filter 150 for the purpose of illustration.

The screen filter 150 is removably mounted on a screen-receiving portion 152 of the suction head 120. The screen-receiving portion 152 includes two spaced-apart holding members 154, 156 over which the interior of the opposite ends of the screen filter 150 are engaged. The screen filter 150 and the holding members 154, 156 are coaxially disposed with reference to a main axis 158. The screen filter 150 can be slid into position from the bottom end of the suction head 120. Variants are also possible.

The holding members 154, 156 are rigidly connected to one another through a perforated cylindrical core 160 that is coaxially disposed with reference to the main axis 158. The cylindrical core 160 is made very rigid and has a hollow interior. Its perforations are significantly wider than those of the screen filter 150. The role of the cylindrical core 160 is not to filter but only to support the parts inside the suction head 120. The suction head 120 includes an annular intervening space 162, defined between the cylindrical core 160 and the screen filter 150, since the outer diameter of the cylindrical core 160 is significantly smaller than the inner diameter of the screen filter 150. Variants in the constructions of the suction head 120 are also possible.

The vacuum system 100 further includes a screen-washing arrangement 170 to wash the screen filter 150 of the suction head 120 from time to time or even constantly while liquid matter is being aspirated. It is washed at least once. Washing the screen filter 150 prevents and/or removes clogging caused by layers of solid matter accumulating on the outer screen surface. It thus ensures an optimal operation of the suction head 120. However, it is not always necessary to remove immediately any layer forming on the outer screen surface since the layer itself becomes a filtering element. Washing the screen filter 150 can also be done at the end of the dewatering to remove the layers in view of the storage of the suction head 120 back on the vehicle 102.

In the illustrated example, the screen-washing arrangement 170 includes a plurality of substantially axisymmetric first tubes 172 provided within the annular space 162 between the cylindrical core 160 and the screen filter 150. Each first tube 172 is slightly curved and oriented substantially towards the inner screen surface of the screen filter 150. Each first tube 172 holds a corresponding nozzle 176 from which the washing fluid will be sprayed as liquid jets onto the screen filter 150. Variants are possible as well.

The illustrated screen-washing arrangement 170 also includes a plurality of substantially axisymmetric and outwardly-extending second tubes 180 provided outside one of the holding members 154, 156, more particularly the one at the top of the suction head 120. Each second tube 180 is curved at right angle and includes a corresponding liquid outlet 182 (FIG. 4) oriented substantially towards the outer screen surface of the screen filter 150. In the illustrated example, each liquid outlet 182 holds a nozzle 184 from which the washing fluid will be sprayed as liquid jets onto the screen filter 150. Variants are possible as well, including using only the first tubes 172 without the second tubes 180, or vice-versa. Other variants are also possible.

The screen-washing arrangement 170 uses the liquid collected inside the liquid matter compartment 144 as a washing fluid. The liquid is supplied through a high-pressure liquid circuit, which includes a circuit subsection extending inside the suction head 120. The high-pressure liquid circuit of the illustrated example includes a liquid pump arrangement 200 mounted on the vehicle 102 and that is in fluid communication with the bottom portion of the liquid matter compartment 144 using one or more conduits. It also includes a flexible pressurized-liquid hose 202 extending between the vehicle 102 and the suction head 120. The flexible pressurized-liquid hose 202 can be provided outside the main flexible hose 130, as shown, or inside the main flexible hose 130.

As best shown in FIGS. 2 and 3, the illustrated suction head 120 also includes a curved-shaped pipe 190 rigidly connected to the top end of the cylindrical core 160. The curved-shaped pipe 190 receives the distal end of the main flexible hose 130 through a removable connection. The angular shape of the curved-shaped pipe 190 facilitates the handling of the suction head 120 by the operator. Variants are also possible.

The subsection of the high-pressure liquid circuit inside the illustrated suction head 120 includes a pressurized-liquid inlet 210 rigidly connected to an outer surface of the curved-shaped pipe 190. The high-pressure liquid circuit subsection also includes an internal conduit 212 located inside the suction head 120 and to which the first tubes 172 and the second tubes 180 are connected.

FIG. 4 is a longitudinal cross-sectional view taken along line 4-4 in FIG. 2.

As shown in FIG. 4, the first tubes 172 of the illustrated example receive the pressurized liquid from a bottom manifold chamber 204 to which corresponding radially-disposed intermediate tubes 206 are connected. The outer end of a corresponding one of the intermediate tubes 206 and the bottom end of a corresponding one of the first tubes 172 are inserted inside the opposite ends of an internal channel of a corresponding intervening connecting member 208. Variants are also possible as well.

The inner side of the second tubes 180 is radially-disposed inside the suction head 120 of the illustrated example. They receive the liquid under pressure through an upper manifold chamber 220 that is part of its high-pressure liquid circuit subsection.

In use, the screen filter 150 is washed by sending pressurized liquid through the flexible pressurized-liquid hose 202. This can be commanded, for instance, by the operator through a corresponding command device, for instance one including a lever or a button. The washing fluid then flows inside the high-pressure liquid circuit subsection of the suction head 120. Some washing fluid will go to the first tubes 172 and some washing fluid will go to the second tubes 180. The liquid jets coming out of the nozzles 176 will impinge on the inner screen surface of the screen filter 150 to push the solid matter away from the outer screen surface. These liquid jets are configured so as to be as wide as possible and also to overlap one another. This will maximize the area being washed. On the outside, the liquid jets coming out of the nozzles 184 will impinge the outer screen surface of the screen filter 150, from the top end towards the bottom, so as to sweep the solid matter away from the outer screen surface. The nozzles 184 are designed to form wide jets that overlap one another to maximize the area being washed.

Once the solids fraction is substantially dewatered, it must be aspirated from within the septic tank 104 onto the vehicle 102, more particularly into the solid matter compartment 142.

The illustrated suction head 120 includes a bottom portion 230 extending under the bottom holding member 156. This bottom portion 230 includes a pipe section in fluid communication with the bottom end of the hollow cylindrical core 160. However, the pipe section is normally closed, for instance by a cap. The bottom portion 230 can be used either as a maintenance access port and/or as an inlet when removing the dewatered solid matter from within the septic tank 104. Alternatively, to remove the dewatered solid matter, the operator can pull the suction head 120 out of the septic tank 104, remove it from the distal end of the main flexible hose 130, and then use the open distal end of the main flexible hose 130 alone. The bottom portion 230 can also be omitted in some designs, if desired. Other variants are also possible.

The solids fraction will inevitably still contain a small amount of remaining liquid matter since the solid matter, although dewatered, will not be totally dry. However, the amount of remaining liquid matter will be significantly less than that of waste content treated using existing vacuum systems. The solids fraction is this considered as being dewatered in such context. Tests showed that the volume of the solid matter can be reduced by a factor of more than two compared to that obtained using an existing vacuum system. In other words, a same vehicle can clean about twice more septic tanks 104 using the proposed vacuum system 100 compared to the same vehicle being equipped with an existing vacuum system.

Before the solid matter can be vacuum pumped into the solid matter compartment 142, the proximal end of the main flexible hose 130 needs to be put in fluid communication with the solid matter compartment 142, for instance the bottom portion thereof. This can be done different ways. For instance, the operator can manually remove the proximal end of the main flexible hose 130 from one port and connect it to another port. Alternatively, the system 100 can include a valve arrangement (not shown) to achieve this goal using a selector, for instance including a lever or a button. As schematically shown in FIG. 1, there is one circuit on the illustrated vacuum system 100 than extends between the bottom of the solid matter compartment 142 to a port at the rear of the vehicle 102, and another circuit than extends between the bottom of the liquid matter compartment 144 to a corresponding port at the rear of the vehicle 102. Variants are possible as well.

When all or substantially all the solid matter is removed from the septic tank 104, the operator needs to put the proximal end of the main flexible hose 130 again in fluid communication with the bottom portion of the liquid matter compartment 144. The liquid fraction can then be returned back into the septic tank 104. However, no dewatering needs to be done beforehand inside the vacuum tank 140 since the liquid matter was always maintained separate from the solid matter.

It should be noted that depending on the implementation, one can use another flexible hose or the like to transfer the liquid fraction back to the septic tank 104 instead of using the main flexible hose 130 for the task. Other variants are possible.

The liquid matter can be allowed to flow by gravity from the liquid matter compartment 144 towards the septic tank 104. Beforehand, the vacuum pump arrangement 148 is stopped and the pressure inside the vacuum tank 140 is increased to be at least that of the atmospheric pressure. The pressure inside the vacuum tank 140 can even be increased above the atmospheric pressure to urge the liquid matter out of the liquid matter compartment 144 more quickly. Alternatively, the liquid matter can be allowed to flow using only gravity and/or using a drain pump for this task. Other variants are possible as well.

Once the liquid matter is transferred back into the septic tank 104, the manholes 114, 116 can be closed. The main flexible hose 130 and the suction head 120 are then stored away on the vehicle 102. The vehicle 102 can leave the site with all the equipment and also the solids fraction removed from the septic tank 104. From the previously-cleaned septic tank 104, the vehicle 102 can be driven to another septic tank 104 to be cleaned. Thus, once in position at the other location, the vacuum system 100 will be used to dewater the sludge-like mixture within this other septic tank 104 using the same suction head 120. The solids fraction that will be removed from this other septic tank 104 will be mixed with the solids fraction from the previously-cleaned septic tank or tanks 104. This process can be repeated many times until the solid matter compartment 142 is full.

As can be appreciated, the proposed vacuum system 100 and method can considerably increase the effectiveness of the dewatered process while significantly decreasing the complexity and costs associated with existing vacuum systems. No dewatering occurs on the vehicle 102 and the suction head 120 is considerably simpler to maintain than a dewatering arrangement inside a vacuum tank. The absence of a dewatering arrangement on the vehicle 102 means that more space is available for storage of the waste content from the septic tanks 104. The increased effectiveness of the dewatering also reduces the volume of the remaining waste from each septic tank 104 and the vehicle 102 can then even clean more sites in a single run, thereby saving time, energy and costs. Still, savings are made as the costs at the waste disposal facility will be divided over more clients visited by the vehicle 102.

Many other advantages will be apparent to those skilled in the art, upon review of the present disclose.

The vacuum system and method as proposed herein can be useful in many different industries, including for instance petroleum extraction and food processing. Many others industries may need such system and method as well.

The present detailed description and the appended figures are meant to be exemplary only. A skilled person will recognize that variants can be made in light of a review of the present disclosure without departing from the proposed concept.

LIST OF REFERENCE NUMERALS 100 vacuum system
102 vehicle
102a chassis
104 container (septic tank)
106 inlet
108 chamber
110 chamber
112 outlet
114 manhole
116 manhole
120 suction head
130 main flexible hose
132 reel
140 vacuum tank
142 solids matter compartment
144 liquid matter compartment
146 partition wall
146a top opening
148 vacuum pump arrangement
150 screen filter 152 screen-receiving portion
154 holding member
156 holding member
158 main axis
160 cylindrical core
162 annular intervening space
170 screen-washing arrangement
172 first tubes
174 outlets
176 nozzles
180 second tubes
182 outlets
184 nozzles
190 curved-shaped pipe
200 liquid pump arrangement
202 flexible pressurized-liquid hose
204 bottom manifold chamber
206 radially-disposed intermediate tubes
208 intervening connecting members
210 inlet
212 internal conduit
220 upper manifold chamber
230 bottom portion

What is claimed is:

1. A vacuum system mounted on a vehicle for dewatering a sludge mixture within a container, removing dewatered solid matter from within the container and then returning liquid matter removed from the sludge mixture back inside the container, the system including:
   a vacuum tank dewatered solid matter compartment, the solid matter compartment having an upper portion and a bottom portion;
   a vacuum tank liquid matter compartment, the liquid matter compartment having an upper portion and a bottom portion, the upper portion of the liquid matter compartment being in direct fluid communication with the upper portion of the solid matter compartment to equalize pressure under vacuum conditions created by a vacuum pump arrangement mounted on the vehicle;
   a main flexible hose having a proximal end and a distal end, the proximal end being selectively made in fluid communication with the solid matter compartment or the liquid matter compartment;
   an immersible suction head connected to the distal end of the main flexible hose, the suction head including a static dewatering screen filter; and
   a screen-washing arrangement having liquid outlets mounted on the suction head to spray liquid jets onto the screen filter, the screen-washing arrangement being in fluid communication with the liquid matter compartment through a pressurized liquid circuit and using the liquid matter from the liquid matter compartment as a washing fluid.

2. The system as defined in claim 1, wherein the screen filter is substantially cylindrical and is removably mounted on a screen-receiving portion of the suction head, the screen filter including an outer screen surface and an inner screen surface, the screen-receiving portion including two spaced-apart holding members over which opposite ends of the screen filter are engaged, the screen filter and the holding members being substantially coaxially disposed with reference to a main axis.

3. The system as defined in claim 2, wherein the holding members are rigidly connected to one another through a perforated cylindrical core coaxially that is substantially disposed with reference to the main axis, the suction head including an annular intervening space between the cylindrical core and the screen filter.

4. The system as defined in claim 3, wherein the screen-washing arrangement includes a plurality of substantially axisymmetric first tubes provided within the annular space between the cylindrical core and the screen filter, each first tube including a corresponding one of the liquid outlets that is oriented substantially towards the inner screen surface of the screen filter.

5. The system as defined in claim 4, wherein each first tube holds a corresponding nozzle.

6. The system as defined in claim 4, wherein the screen-washing arrangement includes a plurality of substantially axisymmetric second tubes provided outside one of the holding members, each second tube including a corresponding one of the liquid outlets that is oriented substantially towards the outer screen surface of the screen filter.

7. The system as defined in claim 6, wherein each outer liquid outlet holds a corresponding nozzle.

8. The system as defined in claim 4, wherein the suction head includes a curved-shaped pipe having a proximal end and a distal end, the proximal end being rigidly connected to one end of the cylindrical core, the proximal end of the curved-shaped pipe removably receiving the distal end of the flexible hose.

9. The system as defined in claim 8, wherein the pressurized liquid circuit includes a circuit subsection extending inside the suction head the circuit subsection having a pressurized-liquid inlet mounted on an outer surface of the curved-shaped pipe.

10. The system as defined in claim 9, wherein the pressurized liquid circuit includes:
    a liquid pump arrangement in fluid communication with the bottom portion of the liquid matter compartment; and
    a flexible pressurized-liquid hose removably connected to the pressurized-liquid inlet.

11. The system as defined in claim 1, wherein the solid matter compartment and the liquid matter compartment are both mounted on a chassis of the vehicle.

12. The system as defined in claim 11, wherein the solid matter compartment and the liquid matter compartment are part of a same vacuum tank, the solid matter compartment and the liquid matter compartment being separated by an intervening partition wall located inside the vacuum tank.

13. The system as defined in claim 12, wherein the solid matter compartment is larger in volume than that of the liquid matter compartment, the partition wall being configured to put the upper portion of the solid matter compartment and the upper portion of the liquid matter compartment in direct fluid communication through an upper opening.

14. The system as defined in claim 13, wherein the vacuum pump arrangement is in fluid communication with both the solid matter compartment and the liquid matter compartment.

* * * * *